July 7, 1964

D. P. HYNES 3,140,107

TUBE COUPLING HAVING SEALING AND ANCHORING MEANS

Filed Nov. 28, 1960

2 Sheets-Sheet 1

INVENTOR.
Dibrell P. Hynes,
BY Parker & Carter
Attorneys.

July 7, 1964  D. P. HYNES  3,140,107
TUBE COUPLING HAVING SEALING AND ANCHORING MEANS
Filed Nov. 28, 1960  2 Sheets-Sheet 2

INVENTOR
DIBRELL P. HYNES

BY Horton, Davis, Brewer & Brugman
ATTORNEY

भ3,140,107
TUBE COUPLING HAVING SEALING AND
ANCHORING MEANS
Dibrell P. Hynes, Chicago, Ill., assignor, by mesne assignments, of fifty percent to Earl E. Howe, Chicago, Ill., twenty-five percent to Richard W. Howe, Mount Prospect, Ill., and twenty-five percent to Margaret H. Frisbey, Erieville, N.Y.
Filed Nov. 28, 1960, Ser. No. 72,086
5 Claims. (Cl. 285—340)

This invention relates to fittings for use in sealing and anchoring high-pressure tubes, and is a continuation-in-part of copending application Serial No. 27,677, filed May 9, 1960 (now abandoned).

One purpose of the present invention is to provide a fitting suitable for use in sealing and anchoring high-pressure tubes and including means for preventing collapse of the tube adjacent the anchoring zone during turnup of the fitting.

Another purpose is to provide a fitting of the type described having improved means for guiding and setting the anchor on the tube.

Another purpose is to provide a fitting of the type described having improved means for anchoring the fitting on the tube.

Another purpose is a fitting of the type described including means effective to reinforce the tube to be sealed adjacent the anchoring zone.

Another purpose is a fitting, suitable for use in sealing and anchoring high-pressure tubes, having improved means for maintaining the anchor in position on the tube.

Other purposes will appear in the ensuing specification, drawings and claims.

Figure 1:
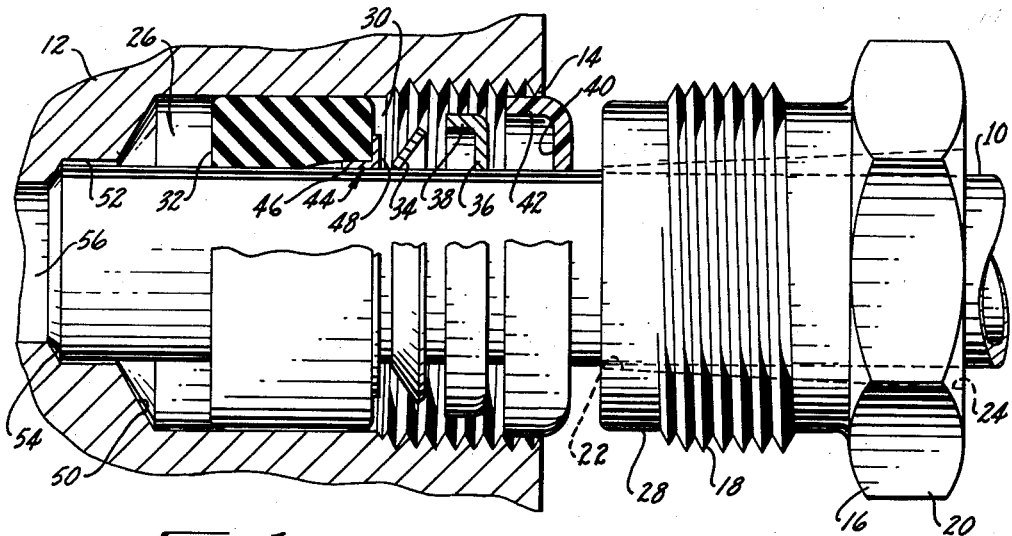
Figure 2:
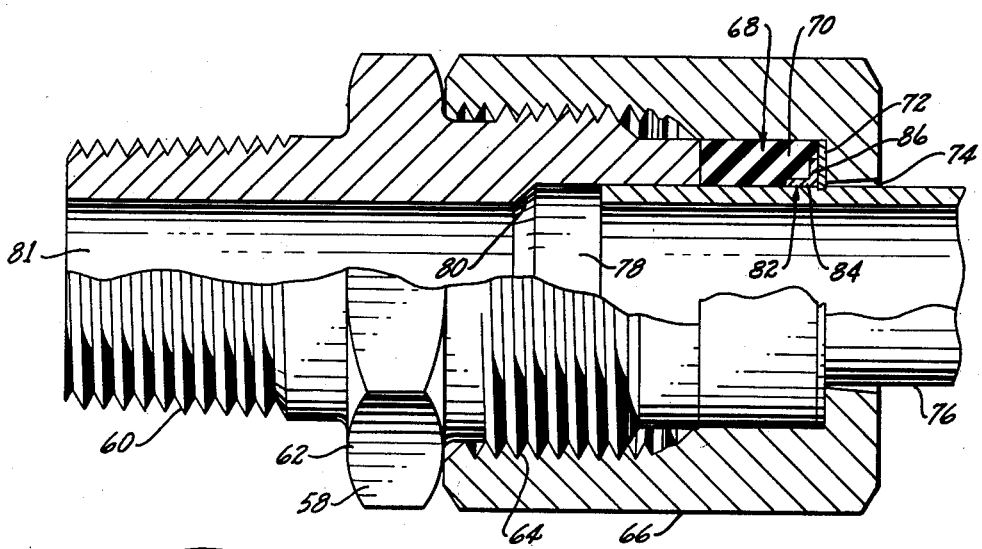
Figure 3:
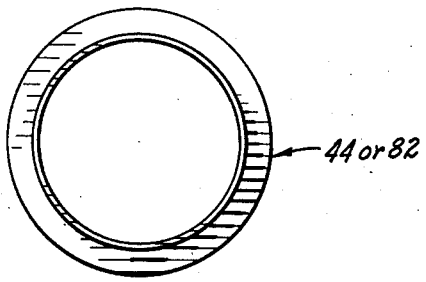
Figure 4:
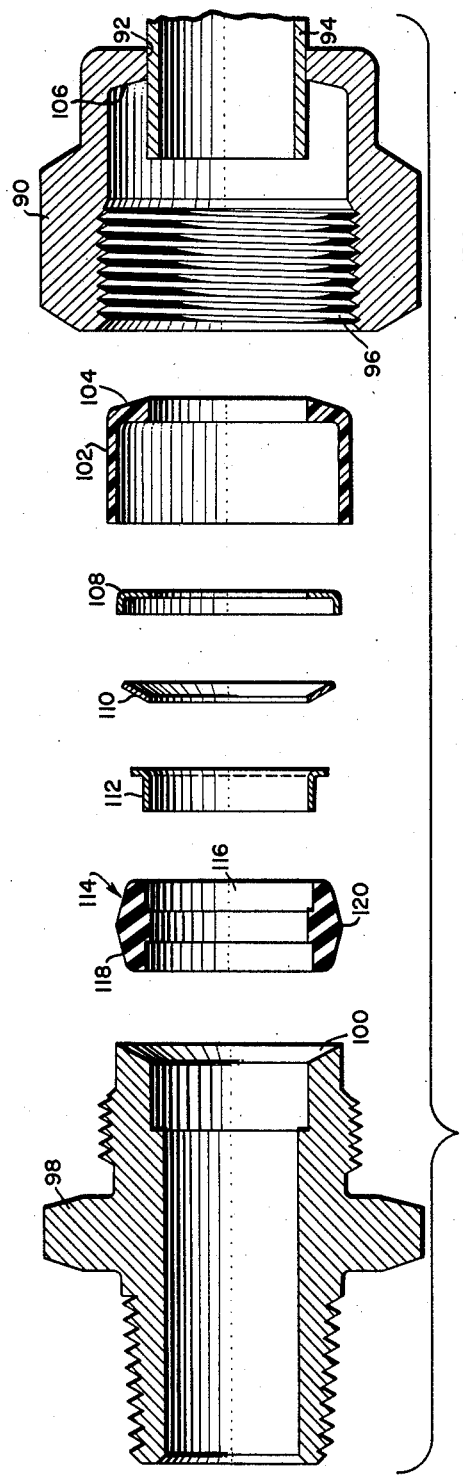
Figure 5:
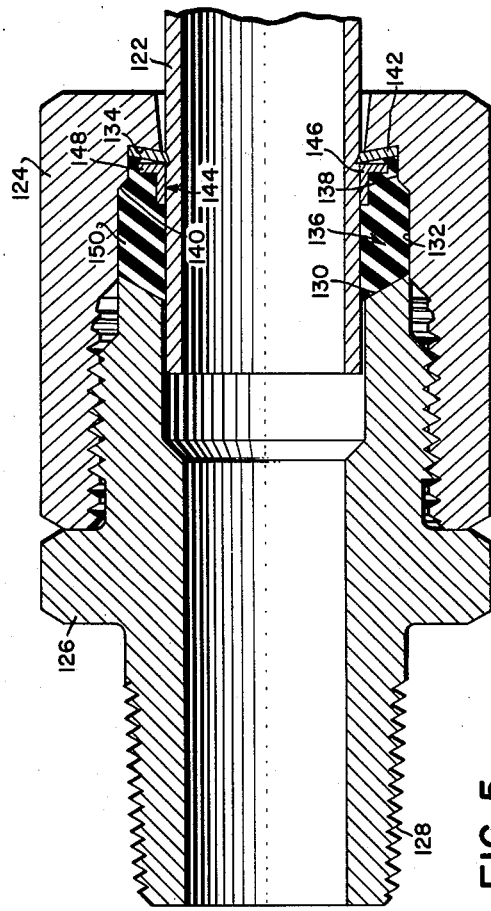

The invention is illustrated diagrammatically in the following drawings wherein:

FIGURE 1 is an axial section showing one form of fitting before the fitting elements are turned up, FIGURE 2 is an axial section of a further form of fitting showing the fitting members in the turned up position, FIGURE 3 is a plan view of the annular thrust guide of the invention, FIGURE 4 is an exploded axial section of a further form of the invention, and FIGURE 5 is an axial section of a further form of fitting embodying the invention.

In FIGURE 1, a tube to be sealed 10, which is normally subjected to high pressures, either static or surge, is inserted into a block or member 12 which may represent the side of a structure, such as a large block, casting or otherwise. The member 12 is interiorly threaded, as at 14, so that a nut 16 having an exterior thread 18 may be secured thereto. The nut 16 may have a tool gripping surface 20 and may have a bore 22 slightly larger than the diameter of the tube 10. Preferably, the bore 22 may be tapered so that the outside end 24 has a larger diameter than the interior end to provide for flexing the tube within the fitting.

The member 12 has a bore indicated generally at 26 which cooperates with the axial extension 28 of the nut 16 to form a chamber 30. Within the chamber 30 is an annular sealing mass or sealing ring 32 which may be formed of rubber, a soft metal or some other distortable material, and an anchor ring 34, preferably conical in shape. Also within the chamber 30 is an annular retainer 36 having a circumferential wall 38 which has an inner diameter sufficient to enclose the conical anchor ring 34. A cushion 40 having a circumferential wall 42 is formed and adapted to enclose both the retainer 36 and the anchor ring 34. In some fittings the circumferential wall 42 of the cushion may extend further to the left and enclose a portion or all of the annular sealing mass 32. However, in the form of the invention shown in the drawings it is sufficient that the cushion enclose the retainer and the anchor ring.

It has been found through extensive tests that when the fitting is turned up and the anchor ring and sealing mass are distorted and pressed against the tube, the anchor ring biting into the tube and the sealing mass forming a tight seal around the tube, that if the tube has weak points or is a very thin walled tube, the sealing mass may exert sufficient pressure to collapse a section of the tube. This collapse may be adjacent the anchoring zone. The collapse of the tube at this point prevents the anchor from firmly biting into the tube and so prevents the fitting from being securely anchored. In order to prevent collapse of the tube adjacent the anchor ring zone, an annular ring, or thrust ring, or thrust guide 44 has been placed adjacent the anchor. The annular ring 44 has an axially extending portion 46 which extends within or underlies the sealing mass 32. The portion 46 is positioned between the sealing mass and the tube, and as the annular ring 44 is preferably made of a sufficiently strong metal, it will prevent collapse of the tube at this point. In other words, it will resist the pressure exerted by the sealing mass. Additionally the ring 44 has an annular or radial portion 48 which is generally perpendicular to the axis of the tube. Besides performing the function of preventing collapse of the tube adjacent the anchoring zone, the annular ring 44 is effective to act as a guide to set the anchor. The portion 48 is positioned to contact the anchor 34 when the fitting is turned up to provide an even strong bite for the anchor.

The fitting shown in FIGURE 1 is completed by an annular slanted wall 50 connecting the bore 26 with a smaller bore 52 which has a diameter just slightly greater than the outer diameter of the tube 10 and a further slanted wall 54 connecting the bore portion 52 with a yet smaller bore 56 having a diameter smaller than the diameter tube, thus forming a stop preventing further entrance of the tube.

FIGURE 2 shows a further form of fitting utilizing an annular ring or thrust guide to prevent collapse of the tube to be sealed and to act as a guide for firmly setting the anchor on the tube. A fitting element or chamber forming element 58 having a threaded surface 60 for connection into a block, casting, housing or the like has a tool gripping surface 62 and a further threaded area 64 for mounting a nut 66. The nut and fitting element together form a chamber 68 within which is positioned an annular sealing mass 70 and an anchor ring 72, similar to that shown in FIGURE 1. As shown in FIGURE 2, the fitting is turned up and hence the anchor ring 72, although it may be conical initially, is shown as generally perpendicular to the tube and biting into the tube. The nut 66 has an interior bore 74, which may be tapered, to permit flexing of tube 76. The fitting element 58 has a bore 78 which has a diameter slightly greater than the outer diameter of the tube 76. A slanted annular wall 80 connects the bore portion 78 with a smaller bore portion 81 having a diameter smaller than the outer diameter of the tube 76.

An annular ring 82, similar to the annular ring 44 of the form shown in FIGURE 1, has an axially extending portion 84 which is positioned between the sealing mass and the tube and an annular portion 86 positioned to contact and abut the anchor ring when the fitting is turned up. The annular ring 82 performs the same function as the annular ring in the form of FIGURE 1 in that it prevents collapse of the tube adjacent the anchoring or gripping zone and further provides a guide for evenly and firmly setting the anchor into the tube as the fitting is turned up. FIGURE 3 shows a plan view of the annular ring or thrust guide used in the fittings of FIGURES 1, 2 and 4.

FIGURE 4 is an exploded axial section of a further form of fitting and includes a nut element 90 having a bore 92 in one end thereof to receive the tube to be sealed 94. The nut 90 is internally threaded, as at 96, so that the nut may be threadedly engaged with a fitting element or connector 98. The connector 98 is generally identical with the connector 60 with the exception of an annular slanted wall 100 which contacts the annular sealing mass when the fitting is turned up. The fitting shown in FIGURE 2 provides a perpendicular annular wall to contact and abut the annular sealing mass. The nut 90 and the connector 98 together define a chamber to receive the various fitting elements.

A cushion 102 generally similar to the cushion 40 illustrated in the fitting of FIGURE 1 may have a somewhat slanted annular wall 104 which contacts a similarly slanted annular wall 106 on the nut 90 when the fitting is turned up. A retainer 108, similar to the retainer shown in FIGURE 1, and a conical anchor ring similar to the anchor ring shown in both FIGURES 1 and 2 are positioned on the tube 94 when the fitting is assembled. A thrust guide or thrust ring 112 similar to the thrust guide described before along with an annular sealing mass 114 completes the fitting shown in FIGURE 4.

The annular sealing mass 114 may have an annular groove or recess or slot 116 extending inwardly from opposite sides of the sealing mass to receive the thrust guide 112 when the fitting is assembled. Preferably there is such an annular groove on each side of the sealing mass for ease in assembly. Additionally, the seal ring 114 may have two oppositely disposed tapered outer surfaces 118 which terminate in a crown 120 generally adjacent the center of a seal ring.

FIGURE 5 shows a further modified fitting embodying the invention. A tube 122 is positioned in a fitting including a nut or chamber forming element 124 threadedly engaged to a fitting member 126. The member 126 may be threaded at 128.

The fitting member 126 is provided with a slanted or frusto-conical annular end wall 130 which cooperates with a circumferential wall 132 and a further slanted or frusto-conical end wall 134 to form an annular compression chamber 136. The compression chamber 136 has a reduced portion adjacent the wall 134 defined by a circumferential wall 138 and a small slanted annular wall 140. The compression chamber thus has a varying diameter in the illustrated embodiment of FIGURE 5.

A frusto-conical anchor ring 142 is positioned on the tube 122 in the chamber for contact with the wall 134 and preferably has an outer diameter substantially equal to the diameter of the wall 138. The conical anchor ring initially, or prior to deformation, has a smaller angle of formation with respect to the axis of the tube than the conical wall 134. Wall 134, as illustrated, has an angle of formation of less than 90 degrees with respect to the longitudinal axis of the tube. In operation, when the fitting is turned up by threadingly advancing member 124 axially toward member 126, wall portion 134 closely engages and supports the anchor ring 142. The anchor ring resultantly conforms to the shape and frusto-conical formation of wall 134 thereby assuming and being limited to the latter's angular disposition with respect to the tube axis. This arrangement importantly prevents the anchor ring from being deflected to positions of 90 degrees or greater relative to the tube axis whereby the same is positively positioned in locking engagement with the tube, preventing axial withdrawal of the tube from the fitting.

A guide 144 having an axial portion 146 and a radial portion 148 is positioned between the anchor ring and a sealing means 150 as described before.

The use, operation and function of the invention are as follows:

Shown and described herein is an improved fitting, suitable for use with high-pressure tubes, and providing improved means for preventing collapse of the tube when the fitting is turned up. In dealing with high-pressure fittings and tubes it is necessary to turn the fitting up as tight as possible in order to prevent any leakage of the pressure fluid within the tube. When turning up a fitting, it has been found that the extreme pressure exerted on the exterior of the tube by the annular sealing mass will, at times, collapse the tube adjacent the anchoring zone. Such a collapse of the tube at this position prevents a secure anchor and hence causes the fitting to fail. In order to prevent collapse of the tube adjacent the anchoring zone, an annular ring or reinforcement for the tube has been placed adjacent this zone.

The annular ring is positioned between the sealing mass and the tube or underlies the sealing mass, in part. The annular ring cannot extend the complete axial length of the sealing mass as it would then prevent an effective seal of the tube. It is only necessary to provide sufficient support for the tube adjacent the anchoring zone or area. In addition, the annular ring preferably has a portion extending in a direction perpendicular to the axis of the tube and positioned to contact the anchor ring. Such a perpendicular portion provides a guide for the anchor ring as the fitting is turned up. The anchor ring has a secure hard even surface to contact as it is forced to bite into the tube. As the annular ring is preferably of metal, it provides a much better contact and driving surface than does the distortable annular sealing mass.

FIGURES 1, 2, 4 and 5 illustrate different forms of fittings which may utilize the particular means shown herein for preventing collapse of the tube adjacent the anchoring zone. The form of fitting shown in FIGURE 1 utilizes a male nut which secures the tube to a machined cavity in a large block or casting and includes a retainer and cushion which together with the anchor ring form an anchoring package which may be inserted into the cavity. In this connection, the retainer of FIGURES 1 and 4 may be modified by the removal of the circumferential flange. A retainer without such a circumferential wall may reduce heating of the seal ring.

The fitting shown in FIGURE 2 does not include a retainer and cushion and utilizes only two fitting elements or chamber forming elements in conjunction with a sealing mass, anchor and annular guide ring or thrust ring. The fitting of FIGURE 5 is similar except for the size and shape of the nut member adjacent the anchor and the provision of the frusto-conical wall portion 134 therein which serves to limit deformation of the anchor ring as hereinbefore described.

A further form of fitting is shown in FIGURE 4 which again utilizes a retainer and cushion. The important feature of the invention is the thrust ring or annular ring preventing collapse of the tube, and the cushion and retainer merely illustrate different forms of fittings with which the invention may be used.

The thrust guide may be separate and apart from the sealing mass or it may be cast into the mass. Additionally, the sealing mass may have a circumferential groove, slot or recess to receive the axially extending portion of the guide. What is important is to provide both an axially extending portion to support the tube and a radial portion to function as a guide to firmly and evenly set the anchor into the tube.

Whereas the preferred form of the invention has been shown and described herein, it should be realized that there are many modifications, substitutions, and alterations thereto within the scope of the following claims.

I claim:

1. A seal and anchoring means for use with relatively thin wall tubes and high pressure tubes comprising a first chamber forming member, a second chamber forming member connectively interfitting with said first chamber forming member to enclose an annular chamber around the tube to be sealed, said chamber forming members being relatively movable to axially adjust the volume of said chamber, an annular sealing mass positioned around the tube in said chamber, a deformable frusto-conical anchor ring slidably mounted on the tube within said chamber, said anchor ring having its smaller, radially innermost end disposed adjacent one end of the sealing mass and its larger, radially outermost end spaced axially therefrom whereby relative axial movement of said chamber forming members to reduce the volume of said chamber serves to axially and radially deform both said sealing mass and anchor ring, causing the larger end of the latter to be moved axially toward said mass and the smaller end thereof to bite radially into the tube at an anchor zone adjacent said one end of said mass while compressing the mass into sealing engagement with said tube; and a substantially non-deformable annular ring positioned on the tube between said anchor ring and the one end of said mass, said annular ring having a portion extending radially outwardly of the tube between said one end of said mass and said anchor ring to guide and set the smaller end of the latter into anchoring biting engagement with the tube at said anchor zone, said annular ring also having another portion extending axially inwardly of said one end of said mass to effectively withhold a portion of said mass lying outwardly thereof from sealing engagement with an underlying portion of the tube whereby the wall of said tube is prevented from deforming radially inwardly adjacent said anchor zone.

2. The combination as set forth in claim 1 including a frusto-conical wall portion at one end of said chamber adjacent said anchor ring, said frusto-conical wall portion serving to operatively engage said anchor ring and limit the latter's axial deformation according to the frusto-conical formation of said wall portion when the said chamber forming members are moved to reduce the volume of said chamber and said anchor ring is thereby deformed and anchored to said tube.

3. The combination as set forth in claim 2 further characterized in that said frusto-conical wall portion is formed with an angle of formation of less than 90 degrees with respect to the longitudinal axis of said tube and said frusto-conical anchor ring is formed with a smaller angle of formation than said wall portion.

4. The combination as set forth in claim 1 including a substantially non-deformable annular retainer ring having an outer circumferential wall circumferentially engaging and radially confining the radially outermost end of said anchor ring.

5. The combination as set forth in claim 4 further including an annular cushion member having a circumferential wall extending partially along the length of said chamber and circumferentially confining said retainer ring therewithin.

References Cited in the file of this patent
UNITED STATES PATENTS
2,448,888  Hynes _____ Sept. 7, 1948
FOREIGN PATENTS
723,400  Great Britain _____ Feb. 9, 1955

UNITED STATES PATENT OFFICE
CERTIFICATE OF CORRECTION

Patent No. 3,140,107　　　　　　　　　　　　　　　　July 7, 1964

Dibrell P. Hynes

It is hereby certified that error appears in the above numbered patent requiring correction and that the said Letters Patent should read as corrected below.

Column 6, under the heading "UNITED STATES PATENTS" add the following:

```
2,444,380    Shimek ---------- June 29, 1948
2,779,610    Risley ---------- Jan. 29, 1957
2,999,701    Blair et al ----- Sept. 12, 1961
```

Signed and sealed this 10th day of November 1964.

(SEAL)
Attest:

ERNEST W. SWIDER
Attesting Officer

EDWARD J. BRENNF
Commissioner of Paten'